(12) United States Patent
Iwaguchi et al.

(10) Patent No.: US 11,828,996 B2
(45) Date of Patent: Nov. 28, 2023

(54) OPTICAL FIBER RIBBON AND OPTICAL FIBER CABLE
(71) Applicant: SUMITOMO ELECTRIC INDUSTRIES, LTD., Osaka (JP)
(72) Inventors: Noriaki Iwaguchi, Osaka (JP); Takashi Fujii, Osaka (JP); Fumiaki Sato, Osaka (JP)
(73) Assignee: SUMITOMO ELECTRIC INDUSTRIES, LTD., Osaka (JP)
( * ) Notice: Subject to any disclaimer, the term of this patent is extended or adjusted under 35 U.S.C. 154(b) by 0 days.
(21) Appl. No.: 17/905,269
(22) PCT Filed: Jan. 18, 2021
(86) PCT No.: PCT/JP2021/001471
§ 371 (c)(1),
(2) Date: Aug. 30, 2022
(87) PCT Pub. No.: WO2021/181880
PCT Pub. Date: Sep. 16, 2021
(65) Prior Publication Data
US 2023/0112900 A1 Apr. 13, 2023
(30) Foreign Application Priority Data
Mar. 9, 2020 (JP) .................................. 2020-039645
(51) Int. Cl.
*G02B 6/44* (2006.01)
*C03C 25/475* (2018.01)
(Continued)
(52) U.S. Cl.
CPC .......... *G02B 6/4403* (2013.01); *C03C 25/105* (2013.01); *C03C 25/32* (2013.01);
(Continued)
(58) Field of Classification Search
CPC .............. G02B 6/4403; G02B 6/02395; G02B 6/4482; C03C 25/475; C03C 25/105; C03C 25/32; C03C 2217/445; C03C 2217/485
(Continued)

(56) References Cited

U.S. PATENT DOCUMENTS 6,197,422 B1 * 3/2001 Murphy ............... G02B 6/4482
522/12
2006/0084716 A1 4/2006 Zahora et al.
(Continued)

FOREIGN PATENT DOCUMENTS

JP H06-242355 A 9/1994
JP 2001-524223 A 11/2001
(Continued)

OTHER PUBLICATIONS

International Search Report issued in Patent Application No. PCT/JP2021/001471 dated Apr. 13, 2021.

*Primary Examiner* — Jerry M Blevins
(74) *Attorney, Agent, or Firm* — PEARNE & GORDON LLP

(57) ABSTRACT

An optical fiber ribbon comprises a plurality of optical fibers arranged in parallel and a connecting resin layer containing a ribbon resin for coating and connecting the plurality of optical fibers, wherein each of the plurality of optical fibers has an outer diameter of 220 μm or less; each of the plurality of optical fibers includes a glass fiber, a primary resin layer, and a colored secondary resin layer; the colored secondary resin layer contains a cured product of a resin composition containing 2,4,6-trimethylbenzoyldiphenylphosphine oxide; and a content of phosphorus in the colored secondary resin layer is 0.03 mass % or more and 0.30 mass % or less, and an amount of a phosphorus-tin complex at the surface of the colored secondary resin layer is 300 ppm or more and 7000 ppm or less.

10 Claims, 5 Drawing Sheets

(51) Int. Cl.
  *C03C 25/105*  (2018.01)
  *C03C 25/32*  (2018.01)
  *G02B 6/02*  (2006.01)

(52) U.S. Cl.
  CPC ........ *C03C 25/475* (2018.01); *G02B 6/02395* (2013.01); *G02B 6/4482* (2013.01); *C03C 2217/445* (2013.01); *C03C 2217/485* (2013.01)

(58) Field of Classification Search
  USPC ........................................................ 385/114
  See application file for complete search history.

(56) References Cited

U.S. PATENT DOCUMENTS

| | | |
|---|---|---|
| 2016/0161692 A1 | 6/2016 | Namazue et al. |
| 2017/0184785 A1 | 6/2017 | Tachibana et al. |
| 2017/0242187 A1 | 8/2017 | Iwaguchi et al. |
| 2017/0307814 A1 | 10/2017 | Tachibana et al. |
| 2017/0307815 A1 | 10/2017 | Iwaguchi et al. |
| 2018/0282208 A1 | 10/2018 | Sato et al. |
| 2018/0364437 A1 | 12/2018 | Tachibana et al. |
| 2019/0011656 A1* | 1/2019 | Sato .................... G02B 6/4408 |
| 2019/0064434 A1 | 2/2019 | Shimada et al. |
| 2020/0047378 A1 | 2/2020 | Iwaguchi et al. |

FOREIGN PATENT DOCUMENTS

| | | |
|---|---|---|
| JP | 2013-088617 A | 5/2013 |
| JP | 5737220 B2 | 6/2015 |
| JP | 5779940 B2 | 9/2015 |
| JP | 5880270 B2 | 3/2016 |
| JP | 2018-177630 A | 11/2018 |
| JP | 2019-045517 A | 3/2019 |
| JP | 2020-026365 A | 2/2020 |
| WO | 98/050317 A1 | 11/1998 |
| WO | 2016/047002 A1 | 3/2016 |
| WO | 2017/065274 A1 | 4/2017 |
| WO | WO-2017065274 A1 * | 4/2017 ......... C03C 25/1065 |
| WO | 2017/082200 A1 | 5/2017 |

* cited by examiner

OPTICAL FIBER RIBBON AND OPTICAL FIBER CABLE

TECHNICAL FIELD

The present disclosure relates to an optical fiber ribbon and an optical fiber cable.

The present application claims priority based on Japanese Patent Application No. 2020-039645 filed on Mar. 9, 2020, and incorporates all the content described in the Japanese Patent Application.

BACKGROUND ART

Generally, an optical fiber has a thin colored outermost layer called as ink layer in order to identify an optical fiber consisting of a glass fiber and a coating resin layer covering the glass fiber (for example, refer to Patent Literature 1).

An optical fiber ribbon including a plurality of optical fibers arranged and collectively integrated with a coating layer is known. For example, for densification and thinning of an optical fiber cable that accommodates an optical fiber ribbon, optical fibers having a thin outer diameter of 220 μm or less connected with a resin are disclosed in Patent Literature 2.

CITATION LIST

Patent Literature

Patent Literature 1: JP H6-242355 A
Patent Literature 2: JP 2013-88617 A

SUMMARY OF INVENTION

The optical fiber ribbon according to one aspect of the present disclosure comprises a plurality of optical fibers arranged in parallel and a connecting resin layer containing a ribbon resin for coating and connecting the plurality of optical fibers, wherein each of the plurality of optical fibers has an outer diameter of 220 μm or less; each of the plurality of optical fibers includes a glass fiber containing a core and a cladding, a primary resin layer in contact with the glass fiber for coating the glass fiber, and a colored secondary resin layer for coating the primary resin layer; the colored secondary resin layer contains a cured product of a resin composition containing 2,4,6-trimethylbenzoyldiphenylphosphine oxide as a photopolymerization initiator; and a content of phosphorus in the colored secondary resin layer is 0.03 mass % or more and 0.30 mass % or less, and an amount of a phosphorus-tin complex at the surface of the colored secondary resin layer is 300 ppm or more and 7000 ppm or less.

DESCRIPTION OF EMBODIMENTS

Figure 1:
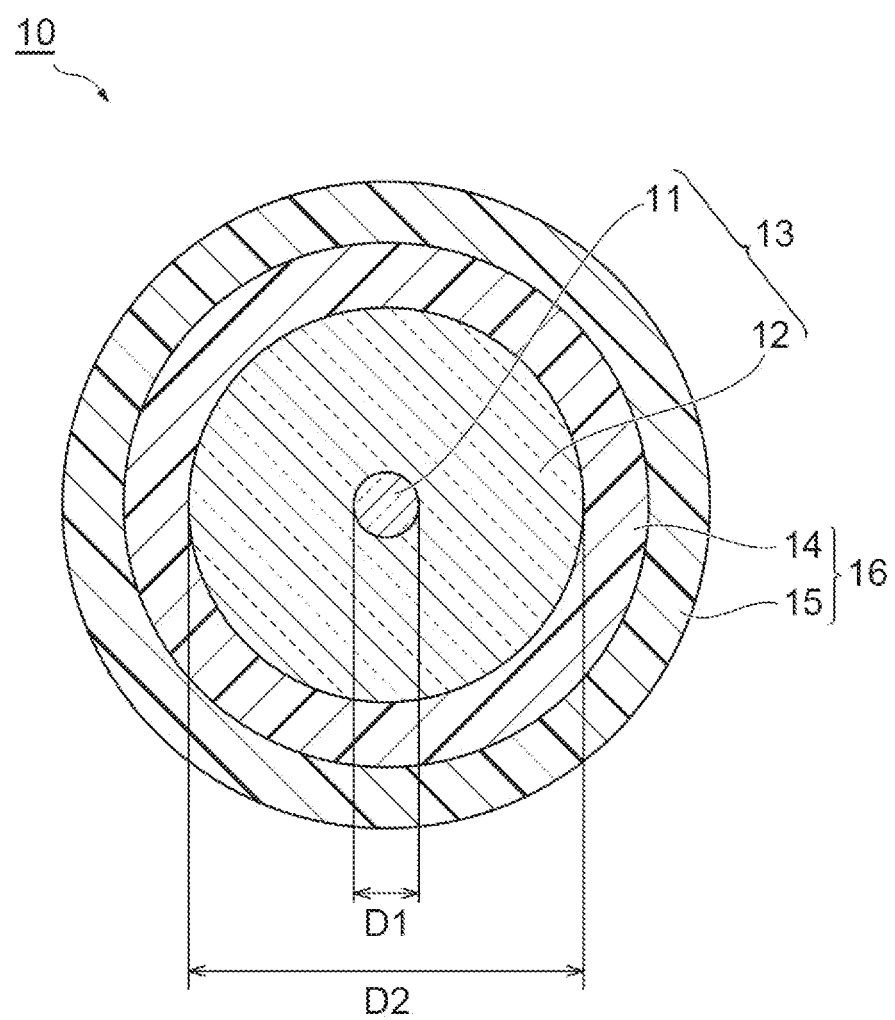
FIG. 1 is a schematic cross-sectional view showing an example of an optical fiber.

Problem to be Solved by the Present Disclosure

A small-diameter optical fiber is more susceptible to lateral pressure due to bending than an optical fiber having an outer diameter of 250 μm, when the optical fiber ribbon is wound around a bobbin or made into an optical cable, so that the lateral pressure resistance is weak and transmission loss tends to increase. Further, in the case of an optical fiber ribbon having small-diameter optical fibers, the contact area between the optical fibers and the ribbon resin coating the optical fibers is small, so that low adhesion of the ribbon resin to the optical fibers tends to cause peeling of the ribbon resin. On the other hand, excessively high adhesion of the ribbon resin to the optical fiber tends to cause difficulty in separation of the optical fibers into single fibers when fixing a terminal of the optical fiber ribbon.

An object of the present disclosure is to provide an optical fiber ribbon composed of small-diameter optical fibers that can achieve both peeling resistance and single-fiber separability and suppress an increase in transmission loss of an optical cable.

Effects of the Present Disclosure

According to the present disclosure, an optical fiber ribbon composed of small-diameter optical fibers that can achieve both peeling resistance and single-fiber separability and suppress an increase in transmission loss of an optical cable can be provided.

Description of Embodiments of the Present Disclosure

First, the embodiments of the present disclosure will be listed and described. The optical fiber ribbon according to one aspect of the present disclosure is an optical fiber ribbon having a plurality of optical fibers arranged in parallel and a connecting resin layer containing a ribbon resin for coating and connecting the plurality of optical fibers, wherein each of the plurality of optical fibers has an outer diameter of 220 μm or less; each of the plurality of optical fibers includes a glass fiber containing a core and a cladding, a primary resin layer in contact with the glass fiber for coating the glass fiber, and a colored secondary resin layer for coating the primary resin layer; the colored secondary resin layer contains a cured product of a resin composition containing 2,4,6-trimethylbenzoyldiphenylphosphine oxide as a photopolymerization initiator; and a content of phosphorus in the colored secondary resin layer is 0.03 mass % or more and 0.30 mass % or less, and an amount of a phosphorus-tin complex at the surface of the colored secondary resin layer is 300 ppm or more and 7000 ppm or less.

The optical fiber ribbon according to the present embodiment can achieve both peeling resistance and single-fiber separability, can be bent sharply when densely accommodated in a cable, and can suppress an increase in transmission loss during bobbin winding or cable making.

Due to superior single-fiber separability of optical fibers, it is preferable that the amount of the phosphorus-tin complex be 500 ppm or more and 6000 ppm or less. Due to easiness in obtaining an optical fiber ribbon having excellent fusion splicing property, it is preferable that the average distance between the centers of adjacent optical fibers among the plurality of optical fibers be 220 μm or more and 280 μm or less.

Due to easiness in controlling the adhesion between the colored secondary resin layer and the ribbon resin, the resin composition may further contain a polyfunctional monomer having a bisphenol moiety, and may further contain a silicone-based lubricant.

Due to superior single-fiber separability of the optical fibers, the resin composition may further contain 1-hydroxycyclohexyl phenyl ketone as a photopolymerization initiator.

Due to more suppression of increase in transmission loss of the optical cable, it is preferable that the Young's modulus of the colored secondary resin layer be 1200 MPa or more at 23° C.

Due to easy deformation of the optical fiber ribbon when accommodated in a cable, the optical fiber ribbon according to the present embodiment may have a connecting portion and a non-connecting portion intermittently in the longitudinal direction and the width direction.

Due to easy deformation of the optical fiber ribbon when accommodated in a cable, the connecting resin layer may have a recess at the portion connecting adjacent optical fibers among the plurality of optical fibers.

In the optical fiber cable according to one aspect of the present disclosure, the optical fiber ribbon is incorporated in a cable. The optical fiber cable provided with the optical fiber ribbon according to the present embodiment can achieve both high lateral pressure characteristics and low transmission loss.

Details of Embodiments of the Present Disclosure

Specific examples of the optical fiber ribbon and the optical fiber cable according to embodiments of the present disclosure will be described with reference to drawings on an as needed basis. The present disclosure is not limited to these examples, being shown in the scope of claims and intended to include equivalents to the claims and all modifications within the scope of the claims. In the following description, the same elements will be denoted by the same reference numerals in the description of the drawings, and duplicate description will be omitted. In the present embodiment, a (meth)acrylate means an acrylate or a methacrylate corresponding thereto, and the same applies to other similar expressions such as (meth)acryloyl.

<Optical Fiber Ribbon>

The optical fiber ribbon according to the present embodiment includes a plurality of optical fibers arranged in parallel which are coated with a ribbon resin. The ribbon resin connects the plurality of optical fibers to form a connecting resin layer.

FIG. 1 is a schematic cross-sectional view showing an example of an optical fiber. An optical fiber 10 includes a glass fiber 13 including a core 11 and a cladding 12, and a coating resin layer 16 including a primary resin layer 14 and a colored secondary resin layer 15 provided on the outer periphery of a glass fiber 13.

The cladding 12 surrounds the core 11. The core 11 and the cladding 12 mainly include glass such as silica glass. For example, the core 11 may be made of silica glass with addition of germanium or pure silica glass, and the cladding 12 may be made of pure silica glass or silica glass with addition of fluorine.

In FIG. 1, the outer diameter of the optical fiber 10 is 220 μm or less, and may be 140 μm or more and 220 μm or less, or 170 μm or more and 220 μm or less. The outer diameter (D2) of the glass fiber 13 is about 100 μm to 125 μm, and the diameter (D1) of the core 11 constituting the glass fiber 13 may be about 7 μm to 15 μm. The thickness of each of the primary resin layer 14 and the colored secondary resin layer 15 may be about 5 μm to 50 μm.

The colored secondary resin layer 15 may be formed by curing, for example, an ultraviolet curable resin composition containing a photopolymerizable compound, a photopolymerization initiator, and a pigment. The resin composition contains 2,4,6-trimethylbenzoyldiphenylphosphine oxide (Omnirad TPO, manufactured by IGM Resins, hereinafter abbreviated as "TPO") as a photopolymerization initiator, which is an essential component, and the colored secondary resin layer 15 contains a cured product of a resin composition containing 2,4,6-trimethylbenzoyldiphenylphosphine oxide as a photopolymerization initiator.

TPO, which is a phosphorus-based photopolymerization initiator, is effective for enhancing the curability of the coating resin layer. On the other hand, phosphorus (P) is known to form a complex (P—Sn complex) with tin (Sn). A tin catalyst may be used as a catalyst for urethane synthesis, in which case tin remains in urethane (meth)acrylate. In the case where TPO is used as the photopolymerization initiator and urethane (meth)acrylate is used as the photopolymerizable compound, phosphorus derived from TPO and tin mixed in the urethane (meth)acrylate form a P—Sn complex in the secondary resin layer. In the case where the P—Sn complex is localized at the surface of the secondary resin layer, the adhesion of the interface between the secondary resin layer and the ribbon resin during production of the optical fiber ribbon is lowered, and peeling is likely to occur during the production of the optical fiber ribbon.

In contrast, since the optical fiber of the present embodiment has a content of phosphorus in the colored secondary resin layer 15 of 0.03 mass % or more and 0.30 mass % or less, and an amount of the P—Sn complex at the surface of the colored secondary resin layer 15 of 300 ppm or more and 7000 ppm or less, both curability and adhesion of the colored secondary resin layer can be achieved.

The content of phosphorus may be 0.05 mass % or more and 0.28 mass % or less, or 0.07 mass % or more and 0.27 mass % or less. The amount of phosphorus complexed with tin may be adjusted by the amount of TPO compounded in the resin composition. The content of phosphorus may be measured by ICP emission spectrometry. Specifically, 20 mL of sulfuric acid and 6 mL of nitric acid are added to 1 g of a resin composition for forming the colored secondary resin layer and the mixture is heated for 10 minutes. Then, 4 mL of perchloric acid is added thereto and the mixture is heated until insoluble substances disappear. The mixture is then diluted with water to a volume of 100 mL for measurement by ICP emission spectrometry.

Due to superior single-fiber separability of the optical fibers, the amount of the P—Sn complex is preferably 400 ppm or more and 6500 ppm or less, more preferably 500 ppm or more and 6000 ppm or less, and still more preferably 3300 ppm or more and 6000 ppm or less. The amount of the P—Sn complex may be adjusted by the amount of TPO and urethane (meth)acrylate compounded in the resin composition. The amount of P—Sn complex may be measured by analyzing the surface of the coating resin layer using TOF-SIMS. In the present specification, the amount of the P—Sn complex (ppm) is expressed in a mass ratio.

The resin composition may further contain another photopolymerization initiator. The other photopolymerization initiator may be appropriately selected from known radical photopolymerization initiators for use. Examples of the other photopolymerization initiators include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropane-1-one, bis(2,6-dimethoxybenzoyl)-2,4,4-trimethylpentylphosphine oxide, 2-methyl-1-[4-(methylthio)phenyl]-2-morpholinopropane-1-one (Omnirad 907, manufactured by IGM Resins) and bis(2,4,6-trimethylbenzoyl)phenylphosphine oxide (Omnirad 819, manufactured by IGM Resins).

As the other photopolymerization initiator, a photopolymerization initiator that forms no complex with tin is preferred, and Omnirad 184 is more preferred. The resin composition including 2,4,6-trimethylbenzoyldiphenylphosphine oxide and 1-hydroxycyclohexyl phenyl ketone in combination as a photopolymerization initiator enables the single-fiber separability of the optical fibers to be further improved.

Due to containing a pigment, the colored secondary resin layer 15 forms a colored layer that serves as ink layer for identifying an optical fiber. Examples of the pigment include a colored pigment such as carbon black, titanium oxide and zinc flower, a magnetic powder such as $\gamma$-$Fe_2O_3$, a mixed crystal of $\gamma$-$Fe_2O_3$ and $\gamma$-$Fe_3O_4$, $CrO_2$, cobalt ferrite, cobalt-deposited iron oxide, barium ferrite, Fe—Co and Fe—Co—Ni, an inorganic pigment such as MIO, zinc chromate, strontium chromate, aluminum tripolyphosphate, zinc, alumina, glass and mica; and an organic pigment such as an azo-based pigment, a phthalocyanine-based pigment, and a dyed lake pigment. The pigment may be subjected to treatments such as various types of surface modification and pigment hybridization.

The photopolymerizable compound may contain an oligomer and a monomer. Examples of the oligomer include a urethane (meth)acrylate and an epoxy (meth)acrylate.

The urethane (meth)acrylate may be a compound obtained by reacting a polyol compound, a polyisocyanate compound, and a hydroxyl group-containing (meth)acrylate compound.

Examples of the polyol compound include polytetramethylene glycol, polypropylene glycol, and bisphenol A/ethylene oxide addition diol. From the viewpoint of adjusting Young's modulus, the number average molecular weight of the polyol compound may be 300 or more and 8000 or less. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate and tripropylene glycol (meth)acrylate.

An organometallic catalyst may be used as a catalyst for synthesizing urethane (meth)acrylate, and an organotin compound may be used from the viewpoint of manufacturability. Examples of the organotin compound include dibutyltin dilaurate, dibutyltin diacetate, dibutyltin malate, dibutyltin bis(2-ethylhexyl mercaptoacetate), dibutyltin bis(isooctyl mercaptoacetate), and dibutyltin oxide. From the viewpoint of easy availability or catalytic performance, it is preferable to use dibutyltin dilaurate or dibutyltin diacetate as the catalyst. Although it is desirable to use a large amount of catalyst from the viewpoint of productivity, it is desirable to control the amount in an appropriate range to avoid precipitation on the surface of the resin layer which easily reduces the adhesion between the ribbon resin and the colored secondary resin layer.

A lower alcohol having 5 or less carbon atoms may be used for synthesizing the urethane (meth)acrylate. Examples of the lower alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Epoxy (meth)acrylate is a compound obtained by reacting an epoxy compound having two or more glycidyl groups with a compound having a (meth)acryloyl group.

As the monomer, a monofunctional monomer having one polymerizable group and a polyfunctional monomer having two or more polymerizable groups may be used. Two or more types of monomers may be mixed for use.

Examples of the monofunctional monomer include (meta) acrylate-based monomers such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meta)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfiryl (meth)acrylate, benzyl (meth)acrylate, dicyclopentenyl (meth)acrylate, dicyclopentenyloxyethyl (meth)acrylate, dicyclopentanyl (meth)acrylate, nonylphenolpolyethylene glycol (meta) acrylate, nonylphenol EO-modified acrylate, nonylphenoxypolyethylene glycol (meth)acrylate, and isobornyl (meth) acrylate; carboxyl group-containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocyclic ring-containing (meth)acrylates such as N-acryloyl morpholine, N-vinylpyrrolidone, N-vinylcaprolactam, N-acryloyl piperidine, N-methacryloyl piperidine, N-acryloyl pyrrolidine, 3-(3-pyridyl)propyl (meth)acrylate, and cyclic trimethylolpropane formal acrylate; maleimide-based monomers such as maleimide, N-cyclohexyl maleimide, and N-phenyl maleimide; N-substituted amide-based monomers such as (meth) acrylamide, N,N-dimethyl (meth)acrylamide, N,N-diethyl (meth)acrylamide, N-hexyl (meth)acrylamide, N-methyl (meth)acrylamide, N-ethyl (meth)acrylamide, N-butyl (meth)acrylamide, N-methylol (meth)acrylamide, and N-methylolpropane (meth)acrylamide; aminoalkyl (meth) acrylate-based monomers such as aminoethyl (meth)acrylate, aminopropyl (meth)acrylate, N,N-dimethylaminoethyl (meth)acrylate, and tert-butylaminoethyl (meth)acrylate; and succinimide-based monomers such as N-(meth)acryloyl oxymethylene succinimide, and N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol compound, tetraethylene glycol di(meth)acrylate, neopentyl glycol hydroxypivalate di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecane diol di(meth)acrylate, 1,20-eicosane diol di(meth) acrylate, isopentyl diol di(meth)acrylate, 3-ethyl-1,8-octane diol di(meth)acrylate, di(meth)acrylate of EO adduct of bisphenol compound, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy-polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaeiythritol tetra(meth)acrylate, dipentaerythritol penta(meth)acrylate, dipentaerythritol hexa(meth)acrylate, and caprolactone-modified tris[(meta)acryloyloxyethyl]isocyanurate.

Examples of the bisphenol compound include bisphenol A, bisphenol AP, bisphenol B, bisphenol BP, bisphenol C, and bisphenol E. As the polyfunctional monomer, a polyfunctional monomer having a bisphenol moiety may be used, and in particular, it is preferable to use a polyfunctional monomer having a bisphenol A moiety. By adjusting the amount of the polyfunctional monomer having a bisphenol A moiety, the amount of surface precipitation of the P—Sn complex can be easily adjusted. As the polyfunctional monomer having a bisphenol moiety A, an epoxy acrylate having a bisphenol A moiety n may be used.

From the viewpoint of further enhancing the adhesion to the ribbon resin, the content of the polyfunctional monomer having a bisphenol moiety in the colored secondary resin layer based on the total amount of the resin composition for forming the colored secondary resin layer may be 25 mass % or more and 80 mass % or less, 30 mass % or more and 75 mass % or less, or 40 mass % or more and 70 mass % or less.

The resin composition may further contain a silane coupling agent, an inorganic oxide particle, a lubricant, a photoacid generator, a leveling agent, an antifoaming agent, an antioxidant, a sensitizer, etc.

The silane coupling agent is not particularly limited as long as it causes no inhibition in curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, and β-(3,4-epoxylcyclohexyl)-ethyltrimethoxysilane, dimethoxydimethylsilane, diethoxydimethylsilane, 3-acryloxypropyl trimethoxysilane, 3-glycidoxypropyl trimethoxysilane, 3-glycidoxypropylmethyl diethoxysilane, 3-methacryloxypropyl trimethoxysilane, N-(β-aminoethyl)-γ-aminopropyltrimethoxysilane, N-(β-aminoethyl)-γ-aminopropyltrimethyl dimethoxysilane, N-phenyl-3-aminopropyl trimethoxysilane, 3-chloropropyl trimethoxysilane, 3-mercaptopropyl trimethoxysilane, 3-aminopropyl trimethoxysilane, bis-[3-(triethoxysilyl)propyl]tetrasulfide, bis-[3-(triethoxysilyl)propyl]disulfide, γ-trimethoxysilylpropyl dimethylthiocarbamyl tetrasulfide, and γ-trimethoxysilylpropyl benzothiazyl tetrasulfide.

The inorganic oxide particle is not particularly limited. From the viewpoint of excellent dispersibility in the resin composition and easy adjustment of Young's modulus, it is preferable that the inorganic oxide particle be a particle containing at least one selected from the group consisting of silicon dioxide (silica), zirconium dioxide (zirconia), aluminum oxide (alumina), magnesium oxide (magnesia), titanium oxide (titania), tin oxide, and zinc oxide. It is more preferable to use silica particle as the inorganic oxide particle, from the viewpoints of low cost, easy surface treatment, ultraviolet permeability, and capability of imparting appropriate hardness to a cured product easily.

It is preferable that the inorganic oxide particle be hydrophobic. Specifically, it is preferable that the surface of the inorganic oxide particle be hydrophobically treated with a silane compound. The hydrophobic treatment means introducing a hydrophobic group into the surface of an inorganic oxide particle. The inorganic oxide particle with a hydrophobic group introduced has excellent dispersibility in a resin composition. Examples of the hydrophobic group may include an ultraviolet curable reactive group such as a (meth)acryloyl group and a vinyl group, or a non-reactive group such as a hydrocarbon group (for example, alkyl group) and an aryl group (for example, phenyl group). In the case where the inorganic oxide particle has a reactive group, a resin layer having a high Young's modulus may be easily formed.

Examples of the silane compound having a reactive group include a silane compound such as 3-methacryloxypropyl trimethoxysilane, 3-acryloxypropyl trimethoxysilane, 3-methacryloxypropyl triethoxysilane, 3-acryloxypropyl triethoxysilane, 8-methacryloxyoctyl trimethoxysilane, 8-acryloxyoctyl trimethoxysilane, 7-octenyl trimethoxysilane, vinyl trimethoxysilane, and vinyl triethoxysilane.

Examples of the silane compound having an alkyl group include methyl trimethoxysilane, dimethyl dimethoxysilane, ethyl trimethoxysilane, propyl trimethoxysilane, butyl trimethoxysilane, pentyl trimethoxysilane, hexyl trimethoxysilane, and octyl trimethoxysilane, methyl triethoxysilane, dimethyl diethoxysilane, ethyl triethoxysilane, propyl triethoxysilane, butyl triethoxysilane, pentyl triethoxysilane, hexyl triethoxysilane, and octyl triethoxysilane.

The inorganic oxide particle may be dispersed in a dispersion medium when added to the resin composition. By using the inorganic oxide particles dispersed in the dispersion medium, the inorganic oxide particles may be uniformly dispersed in the resin composition, so that the storage stability of the resin composition can be improved. The dispersion medium is not particularly limited as long as it causes no inhibition of the curing of the resin composition. The dispersion medium may be reactive or non-reactive.

As the reactive dispersion medium, a monomer such as a (meth)acryloyl compound or an epoxy compound may be used. Examples of the (meth)acrylic compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth)acrylate, 2-hydroxy-3-phenoxypropyl acrylate, (meth)acrylic acid adduct of propylene glycol diglycidyl ether, (meth)acrylic acid adduct of tripropylene glycol diglycidyl ether, and (meth)acrylic acid adduct of glycerol diglycidyl ether. As the dispersion medium, a (meth)acryloyl compound such as the monomer described above may be used.

As the non-reactive dispersion medium, a ketone solvent such as methyl ethyl ketone (MEK) and methyl isobutyl ketone (MIBK), an alcohol solvent such as methanol (MeOH) and propylene glycol monomethyl ether (PGME), or an ester solvent such as propylene glycol monomethyl ether acetate (PGMEA) may be used. In the case of the non-reactive dispersion medium, after mixing of the base resin and inorganic oxide particles dispersed in a dispersion medium, a part of the dispersion medium may be removed to prepare a resin composition.

From the viewpoint of excellent dispersibility in the resin composition, the average primary particle size of the inorganic oxide particles may be 650 nm or less, preferably 600 nm or less, more preferably 500 nm or less, still more preferably 400 nm or less. From the viewpoint of excellent strength after curing, the average primary particle size of the inorganic oxide particles is preferably 5 nm or more, more preferably 10 nm or more. The average primary particle size may be measured by, for example, image analysis of an electron micrograph, a light scattering method, a BET method, or the like. The dispersion medium in which the primary particles of the inorganic oxide having a small particle size are dispersed is visually transparent. The dispersion medium in which the primary particles having a relatively large particle size (40 nm or more) are dispersed is cloudy, though no sediment is observed.

The content of the inorganic oxide particles based on the total amount of the resin composition may be 1 mass % or more and 45 mass % or less, 2 mass % or more and 40 mass % or less, or 3 mass % or more and 35 mass % or less. With a content of the inorganic oxide particles of 1 mass % or more, a tough cured product tends to be formed. With a content of the inorganic oxide particles of 45 mass % or less, a cured product in which the inorganic oxide particles are suitably dispersed tends to easily be formed. The total amount of the resin composition and the total amount of the cured product of the resin composition may be substantially the same.

Examples of the lubricant include a silicone-based lubricant such as silicone oil. The silicone oil may be a high molecular weight silicone oil or a modified silicone oil having apart of the dimethylsiloxane moiety modified with an organic group. Examples of the modified silicone oil include a polyether-modified, amine-modified, epoxy-modified, mercapto-modified, (meth)acrylic-modified, or carboxyl-modified silicone oil. The colored secondary resin layer has lower curability than the secondary resin layer containing no pigment, and the adhesive force with the tape resin layer tends to increase. However, by using a resin composition containing a silicone-based lubricant, the adhesion between the colored secondary resin layer and the ribbon resin tends to be easily adjusted.

The content of the silicone-based lubricant in the colored secondary resin layer based on the total amount of the resin composition for the secondary resin layer is preferably 2 mass % or less, more preferably 0.1 mass % or more and 1 mass % or less. With a too small molecular weight, the silicone-based lubricant tends to precipitate, so that the adhesion to the connecting resin layer or the primary resin layer decreases. With a too large molecular weight of the silicone-based lubricant, the compatibility with the resin component decreases. It is preferable that the average molecular weight of the silicone oil be 10000 or more and 100000 or less.

As the photoacid generator, an onium salt having an $A^+B^-$ structure may be used. Examples of the photoacid generator include a sulfonium salt such as UVACURE1590 (manufactured by Daicel-Cytec), CPI-10P, 110P, and 210S (manufactured by San-Apro), and an iodonium salt such as Omnicat 250 (manufactured by IGM Resins), WPI-113 (manufactured by Fujifilm Wako Pure Chemical Corporation), and Rp-2074 (manufactured by Rhodia Japan).

The Young's modulus of the colored secondary resin layer at 23° C. is preferably 1200 MPa or more, more preferably 1300 MPa or more, and still more preferably 1400 MPa or more. The Young's modulus of the colored secondary resin layer at 23° C. may be 3000 MPa or less, 2500 MPa or less, 2000 MPa or less, or 1800 MPa or less. With a Young's modulus of the colored secondary resin layer of 1200 MPa or more, the lateral pressure resistance characteristics are easily improved, while with a Young's modulus of 3000 MPa or less, the colored secondary resin layer has an appropriate breaking elongation to be hardly broken during coating removal, resulting in excellent coating removability.

The primary resin layer 14 may be formed by curing an ultraviolet curable resin composition containing a photopolymerizable compound, a photopolymerization initiator, and a silane coupling agent. The polymerizable compound, the photopolymerization initiator, and the silane coupling agent may be appropriately selected from the resin compositions described as examples for forming the colored secondary resin layer. However, the resin composition for forming the primary resin layer has a composition different from the resin composition for forming the colored secondary resin layer.

From the viewpoint of suppressing the generation of voids in the optical fiber, the Young's modulus of the primary resin layer at 23° C. is preferably 0.04 MPa or more and 0.8 MPa or less, more preferably 0.05 MPa or more and 0.7 MPa or less, and still more preferably 0.05 MPa or more and 0.6 MPa or less.

The characteristics of the optical fiber used in the present disclosure may include, for example, a mode field diameter of 8.2 µm or more and 9.6 µm or less at a wavelength of 1310 nm, a cable cutoff wavelength of 1260 nm or less, and a loss increase of 0.1 dB or less at a wavelength of 1625 nm when wound with 100 turns around a mandrel having a radius of 30 mm (per 100 turns), or a loss increase of 1.0 dB or less at a wavelength of 1625 nm when wound with 10 turns around a mandrel having a radius of 15 mm (per 10 turns).

Figure 2:
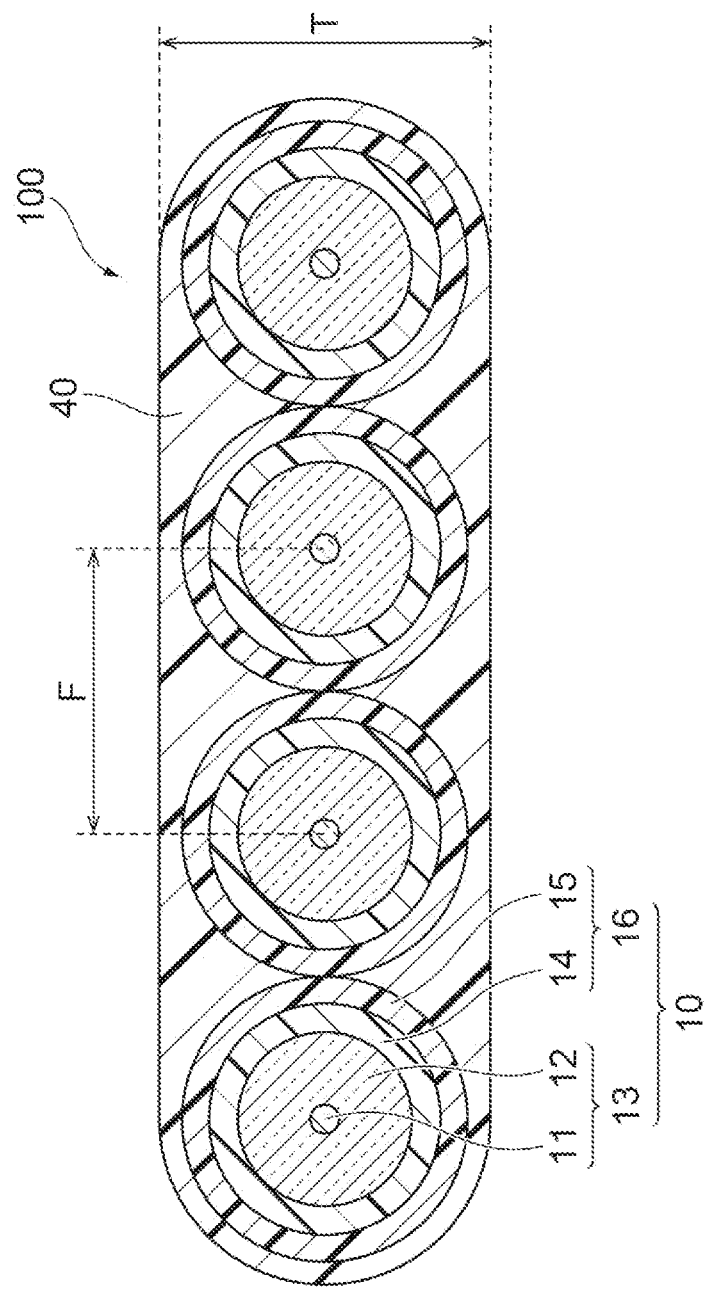
FIG. 2 is a schematic cross-sectional view showing an optical fiber ribbon according to an embodiment.

FIG. 2 is a schematic cross-sectional view showing an optical fiber ribbon according to an embodiment. An optical fiber ribbon 100 has a plurality of optical fibers 10 and a connecting resin layer 40 in which the optical fibers 10 are (integrally) coated with a ribbon resin and connected. In FIG. 2, four optical fibers 10 are shown as an example, though the number thereof is not particularly limited.

The optical fibers 10 in contact with each other in parallel may be integrated, or a part or all of the optical fibers 10 in parallel at regular intervals may be integrated. However, in the case where a part or all of the optical fibers 10 in parallel at regular intervals are integrated, the average distance F between the centers of the adjacent optical fibers 10 may be 220 µm or more and 280 µm or less. In the case where the distance between the centers is controlled to 220 µm or more and 280 µm or less, it is easy to place the optical fibers in existing V-grooves, so that an optical fiber ribbon having excellent batch fusion property can be obtained. The thickness T of the optical fiber ribbon 100 may be 164 µm or more and 285 µm or less, though depending on the outer diameter of the optical fiber 10.

The resin composition for the ribbon may contain urethane (meth)acrylate, a monomer and a photopolymerization initiator. The urethane (meth)acrylate, the monomer and the photopolymerization initiator may be appropriately selected from the resin compositions for forming the colored secondary resin layer described as examples. By containing a cured product of urethane (meth)acrylate in the ribbon resin (connecting resin), the elasticity of the connecting resin layer can be improved.

The ribbon resin may further contain a silicone-based lubricant. Due to containing a silicone-based lubricant, the ribbon resin can suppress the sticking of the optical fiber ribbons to each other, and allows the loss increase to be easily reduced when made into a cable.

The Young's modulus of the ribbon resin at 23° C. may be 50 MPa or more and 900 MPa or less, or 100 MPa or more and 800 MPa or less, from the viewpoint of ensuring compatibility between the lateral pressure resistance characteristics and flexibility of the optical fiber ribbon.

Figure 3:
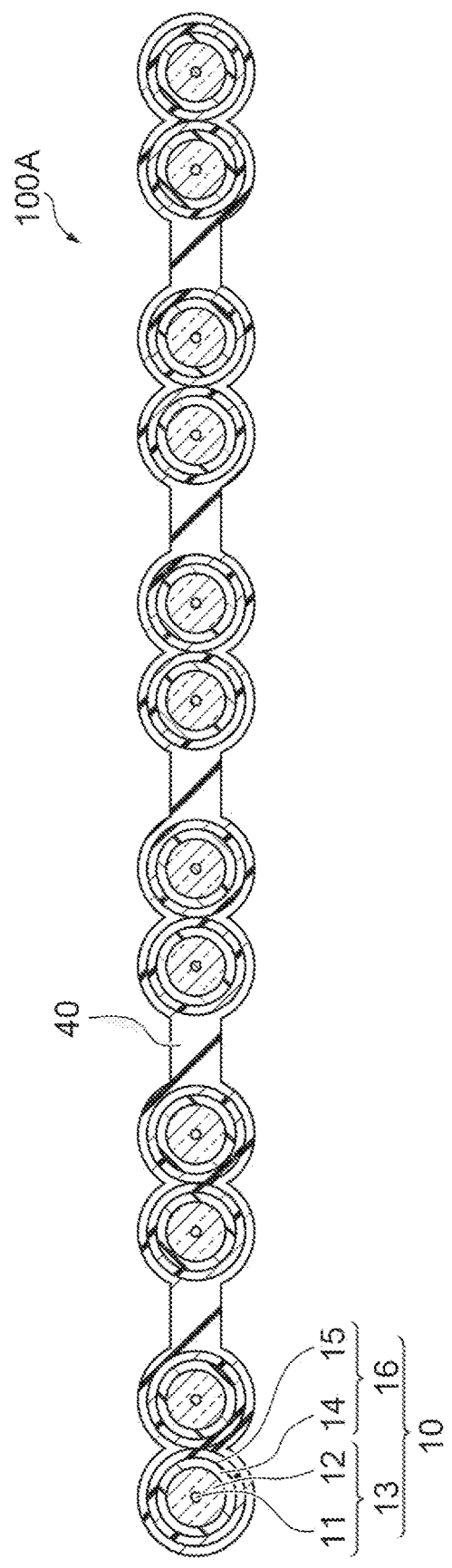
FIG. 3 is a schematic cross-sectional view showing an optical fiber ribbon according to an embodiment.

FIG. 3 is a schematic cross-sectional view showing an example of the optical fiber ribbon having optical fibers integrated in parallel at regular intervals. An optical fiber ribbon 100A shown in FIG. 3 includes six sets of two optical fibers 10 at regular intervals connected by a ribbon resin. The ribbon resin forms a connecting resin layer 40.

In the case where the optical fibers 10 are arranged in parallel at regular intervals, that is, in the case where the adjacent optical fibers 10 are joined through the ribbon resin without contacting each other, the thickness of the connecting portion at the center of the optical fibers 10 may be 150 µm or more and 220 µm or less. The optical fiber ribbon may have a recess at the connecting portion of the optical fiber, due to easy deformation of the optical fiber ribbon when accommodated in a cable. The recess may be formed in a triangular shape having a narrow angle on one surface of the connecting portion.

Figure 4:
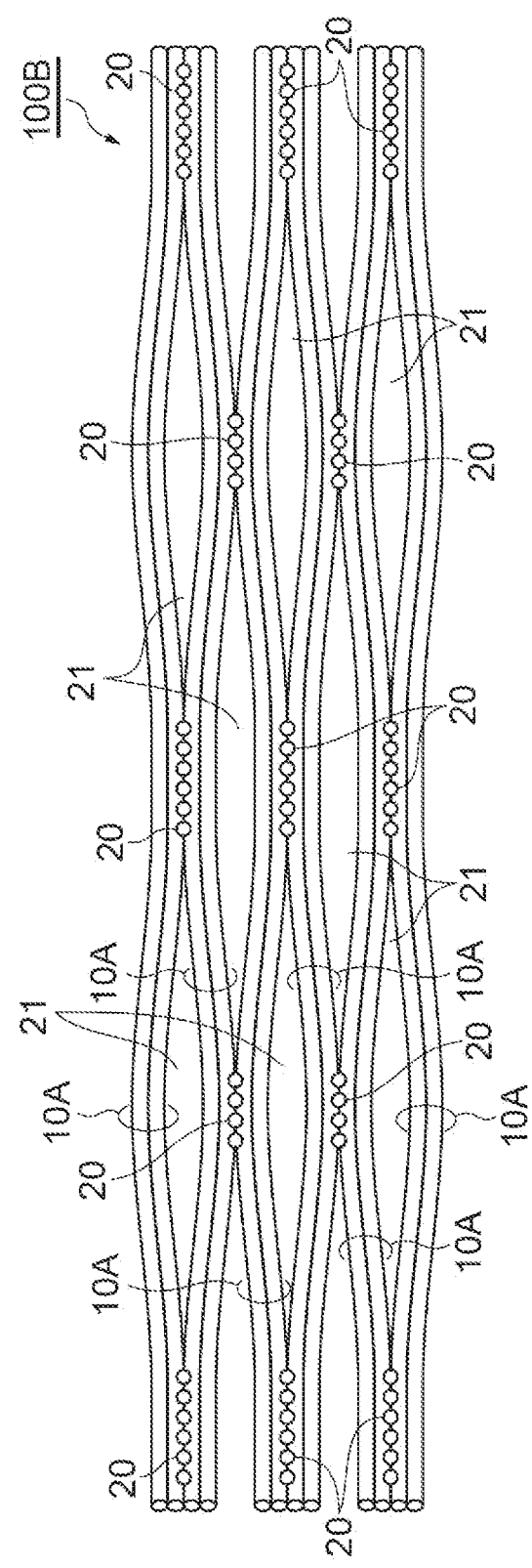
FIG. 4 is a plan view showing the appearance of an intermittent optical fiber ribbon according to an embodiment.

The optical fiber ribbon according to the present embodiment may have a connecting portion and a non-connecting portion intermittently in the longitudinal direction and the width direction. FIG. 4 is a plan view showing the appearance of the optical fiber ribbon according to an embodiment. An optical fiber ribbon 100B has a plurality of optical fibers, a plurality of connecting portions 20, and non-connecting portions (dividing portions) 21. The non-connecting portion 21 is formed intermittently in the longitudinal direction of the optical fiber ribbon. The optical fiber ribbon 100B is an intermittently connected optical fiber ribbon in which the connecting portion 20 and the non-connecting portion 21 are intermittently provided in the longitudinal direction for each of the two optical fibers 10A. The "connecting portion" refers to a portion in which adjacent optical fibers are integrated through a connecting resin layer, and the "non-connecting portion" refers to a portion in which adjacent optical fibers are not integrated through a connecting resin layer, having a gap portion between the optical fibers.

Since the optical fiber ribbon having the structure described above is provided with the non-connecting portion 21 intermittently in the connecting portion 20 for each of the two fibers, the optical fiber ribbon is easily deformed. Therefore, the optical fiber ribbon is easily rolled for incorporation in the optical fiber cable, so that the optical fiber ribbon suitable for high-density packaging can be obtained. Further, since the connecting portion 20 can be easily torn from the non-connecting portion 21 as a starting point, single fiber separation of the optical fibers 10 in the optical fiber ribbon is easily performed.

The intermittently connected optical fiber ribbon may be manufactured by using, for example, a manufacturing apparatus having a swing blade described in JP 5779940 B, JP 5880270 B, or JP 5737220 B.

<Optical Fiber Cable>

The optical fiber cable according to the present embodiment includes the optical fiber ribbon incorporated in the cable. Examples of the optical fiber cable include a slot-type optical fiber cable having a plurality of slot grooves. The optical fiber ribbon can be incorporated in the slot groove, such that the packaging density in each of the slot grooves is about 25% to 65%. The packaging density means the ratio of the cross-sectional area of the optical fiber ribbon incorporated in the slot groove relative to the cross-sectional area of the slot groove.

EXAMPLES

Hereinafter, the results of the evaluation tests in Examples and Comparative Examples according to the present disclosure will be shown to describe the present disclosure in more detail. The present invention, however, is not limited to these Examples.

[Resin Composition for Secondary Resin Layer]
(Photopolymerizable Compound)

As the photopolymerizable compounds, a urethane acrylate, which is a reaction product of polypropylene glycol having a molecular weight of 800, isophorone diisocyanate, and 2-hydroxyethyl acrylate, an epoxy acrylate having a bisphenol A moiety, isobornyl acrylate, N-vinylcaprolactam, and tripropylene glycol diacrylate were prepared.
(Photopolymerization Initiator)

As photopolymerization initiators, 2,4,6-trimethylbenzoyl diphenylphosphine oxide (TPO) and 1-hydroxycyclohexyl phenyl ketone (Omnirad 184) were prepared.
(Silicone-Based Lubricant)

As the silicone-based lubricant, a modified silicone oil (polyether modified, average molecular weight: 15000) was prepared.
(Pigment)

As the pigments, titanium oxide and copper phthalocyanine were prepared.

Preparation Example 1

A resin composition S1 for a colored secondary resin layer was prepared by mixing 40 parts by mass of urethane acrylate, 25 parts by mass of epoxy acrylate, 6.2 parts by mass of isobornyl acrylate, 5 parts by mass of N-vinylcaprolactam, 15 parts by mass of tripropylene glycol diacrylate, 0.8 parts by mass of TPO, 1.0 part by mass of Omnirad 184, 1.0 part by mass of silicone oil, 3.0 parts by mass of titanium oxide, and 3.0 parts by mass of copper phthalocyanine.

Preparation Example 2

A resin composition S2 was prepared in the same manner as in Preparation Example 1, except that the amount of isobornyl acrylate was changed to 5.5 parts by mass and the amount of TPO was changed to 1.5 parts by mass.

Preparation Example 3

A resin composition S3 was prepared in the same manner as in Preparation Example 1, except that the amount of isobornyl acrylate was changed to 5.0 parts by mass, and the amount of TPO was changed to 2.0 parts by mass.

Preparation Example 4

A resin composition S4 was prepared in the same manner as in Preparation Example 1, except that the amount of urethane acrylate was changed to 25 parts by mass, the amount of epoxy acrylate was changed to 40 parts by mass, the amount of isobornyl acrylate was changed to 5.0 parts by mass, and the amount of TPO was changed to 2.0 parts by mass.

Preparation Example 5

A resin composition S5 was prepared in the same manner as in Preparation Example 1, except that the amount of urethane acrylate was changed to 15 parts by mass, the amount of epoxy acrylate was changed to 50 parts by mass, the amount of isobornyl acrylate was changed to 5.0 parts by mass, and the amount of TPO was changed to 2.0 parts by mass.

Preparation Example 6

A resin composition S6 was prepared in the same manner as in Preparation Example 1, except that the amount of urethane acrylate was changed to 7.5 parts by mass, the amount of epoxy acrylate was changed to 60 parts by mass, the amount of isobornyl acrylate was changed to 2.5 parts by mass, and the amount of TPO was changed to 2.0 parts by mass.

Preparation Example 7

A resin composition S7 was prepared in the same manner as in Preparation Example 1, except that the amount of urethane acrylate was changed to 7.5 parts by mass, the amount of epoxy acrylate was changed to 60 parts by mass, the amount of isobornyl acrylate was changed to 2.0 parts by mass, and the amount of TPO was changed to 2.5 parts by mass.

Preparation Example 8

A resin composition S8 was prepared in the same manner as in Preparation Example 1, except that the amount of urethane acrylate was changed to 7.5 parts by mass, the amount of epoxy acrylate was changed to 60 parts by mass, the amount of isobornyl acrylate was changed to 1.5 parts by mass, and the amount of TPO was changed to 3.0 parts by mass.

Preparation Example 9

A resin composition S9 was prepared in the same manner as in Preparation Example 1, except that the amount of isobornyl acrylate was changed to 6.8 parts by mass, and the amount of TPO was changed to 0.25 parts by mass.

Preparation Example 10

A resin composition S10 was prepared in the same manner as in Preparation Example 1, except that the amount of urethane acrylate was changed to 7.0 parts by mass, the amount of epoxy acrylate was changed to 60 parts by mass, the amount of isobornyl acrylate was changed to 1.0 part by mass, and the amount of TPO was changed to 4.0 parts by mass.

[Resin Composition for Primary Resin Layer]

A resin composition for the primary resin layer was prepared by mixing 75 parts by mass of urethane acrylate, which is a reaction product of polypropylene glycol having a molecular weight of 2000, 2,4-tolylene diisocyanate, 2-hydroxyethyl acrylate and methanol, 12 parts by mass of nonylphenol EO-modified acrylate, and 6 parts by mass of N-vinylcaprolactam, 2 parts by mass of 1,6-hexanediol diacrylate, 1 part by mass of TPO, and 1 part by mass of γ-mercaptopropyl trimethoxysilane.

[Resin Composition for Ribbon]

A resin composition for ribbon was prepared by mixing 70 parts by mass of polypropylene glycol having a molecular weight of 1000, 2,4-tolylene diisocyanate and 2-hydroxyethyl acrylate, 10 parts by mass of 2-phenoxyethyl acrylate, 13 parts by mass of tripropylene glycol diacrylate, 5 parts by mass of N-vinylcaprolactam, 1 part by mass of TPO, and 1 part by mass of Omnirad 184.

[Preparation of Optical Fiber]

A resin composition for a primary resin layer and a resin composition for a secondary resin layer are applied to the outer periphery of a glass fiber having a diameter of 125 μm composed of a core and a cladding, and then irradiated with ultraviolet rays to cure the resin composition, so that an optical fiber having an outer diameter of 200 μm including a primary resin layer having a thickness of 20 μm and a colored secondary resin layer having a thickness of 17.5 μm on the outer periphery thereof was prepared. The line speed was 1500 n/min.

[Preparation of Optical Fiber Ribbon]

Figure 5:
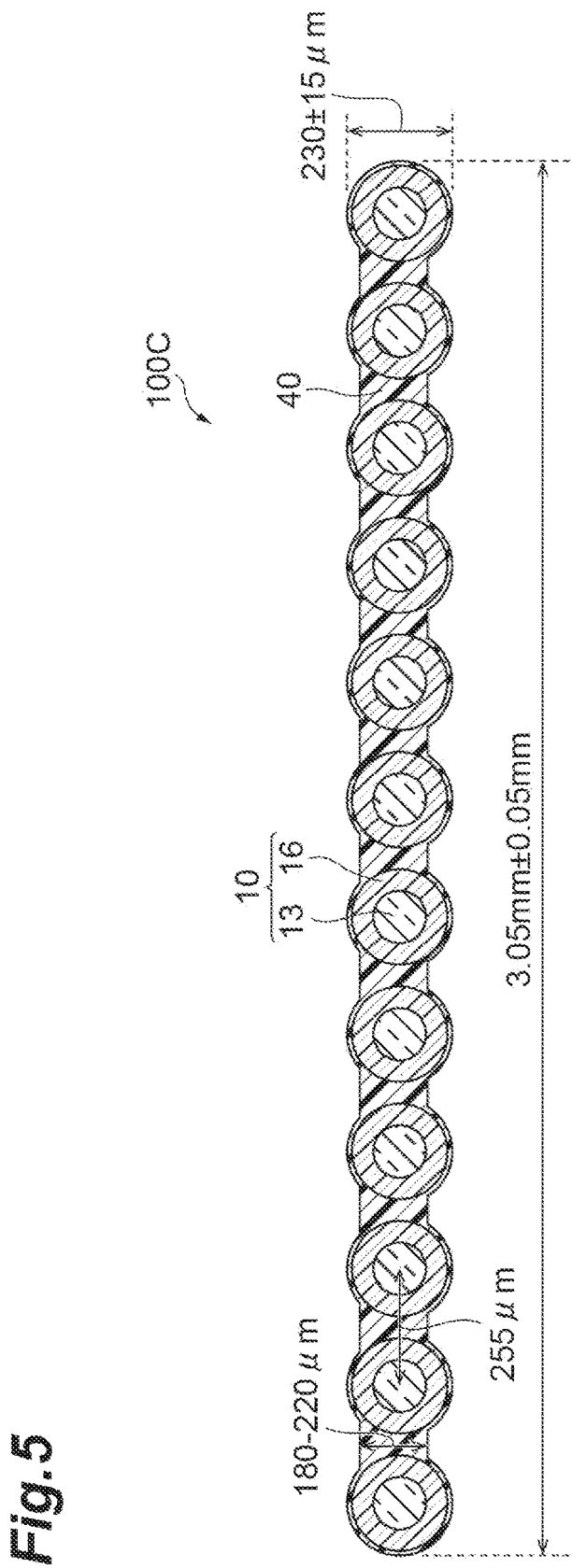
FIG. 5 is a schematic cross-sectional view showing an optical fiber ribbon according to an embodiment.

A resin composition for a ribbon was applied around 12 colored optical fibers and then cured by irradiation with ultraviolet rays to form a connecting resin layer, so that an optical fiber ribbon shown in FIG. 5 was prepared. FIG. 5 is a schematic cross-sectional view showing a prepared optical fiber ribbon 100C. The optical fibers 10 are connected by a ribbon resin at regular intervals. The thickness of the connecting portion between the optical fibers was 180 μm to 220 μm, the distance between the centers of the adjacent optical fibers was 255 μm, the thickness of the optical fiber ribbon was 230 μm±15 μm, and the width of the optical fiber ribbon was 3.05 mm±0.05 mm.

[Evaluation]

The following evaluations were made on the optical fiber and the optical fiber ribbon. The evaluation results of the optical fiber and the optical fiber ribbon prepared in Examples are shown in Table 1, and the evaluation results of the optical fiber and the optical fiber ribbon prepared in Comparative Examples are shown in Table 2.

(Young's Modulus)

The Young's modulus of the primary resin layer was measured by the Pullout Modulus (POM) method at 23° C. Two points of the optical fiber were fixed with two chuck devices, and the coating resin layer (primary resin layer and secondary resin layer) portion between the two chuck devices was removed. Then, one chuck device was fixed and the other chuck device was gently moved in the opposite direction of the fixed chuck device. When the length of a portion of the optical fiber grasped by the moving chuck device is represented by L, the moving amount of the chuck by Z, the outer diameter of the primary resin layer by Dp, the outer diameter of the glass fiber by Df, and the Poisson's ratio of the primary resin layer by n, and the load during movement of the chuck device by W, the Young's modulus of the primary resin layer was obtained from the following formula. The Young's modulus of the primary resin layer was 0.6 MPa.

$$\text{Young's modulus(MPa)}=((1+n)W/\pi LZ)\times\ln(Dp/Df)$$

The Young's modulus of the colored secondary resin layer was obtained from the 2.5% secant line value in a tensile test (distance between marked lines: 25 mm) at 23° C. of a pipe-shaped coating resin layer (length: 50 mm or more) obtained by immersing an optical fiber in a solvent (ethanol:acetone=3:7) and pulling a glass fiber out.

(Amount of P—Sn Complex)

The surface of the colored secondary resin layer was analyzed by TOF-SIMS. The apparatus used was TRIFT V nanoTOF, with an ion species Au+, and an acceleration voltage of 30 kV. The measurement was performed by irradiating an ion beam from the side of the optical fiber. The ratio between the peak value at +337 (m/z) (representing the amount of phosphorus-tin complex) and the peak value at +59 (m/z) (representing the amount of hydrocarbon), i.e. (peak value at +337/peak value at +59), expressed in ppm was designated as an amount of P—Sn complex.

(Single Fiber Separation)

An optical fiber ribbon having a length of 1 m was stored in an environment at 85° C. and 85% for 60 days. The optical fiber ribbon was bared to the single fiber at an end over several cm and separated in the longitudinal direction of the optical fiber ribbon. The ribbon resin tended to remain on the end of the optical fiber ribbon. In the evaluation, the case where the ribbon resin was peeled for a length of 1 m without break was evaluated as "A", the case where the ribbon resin was peeled for a length of 1 m within 5 times of break of the ribbon resin was evaluated as "B", and the case where the break of ribbon resin occurred 6 times or more, the case where the ribbon resin was unable to be peeled, or the case where the colored layer was peeled even though the peeling was possible, was evaluated as "C".

(Peeling Resistance)

After compressing the optical fiber ribbon 10 times in the width direction, the case where no fiber spill occurred was evaluated as "OK", and the case where fiber spill occurred was evaluated as "NG".

(Cable Loss Characteristics)

The optical fiber cable was allowed to stand in an environment of 23° C., and the value of the transmission loss for a wavelength of signal light of 1.55 μm was measured. The measured values were evaluated according to the following criteria.

A: transmission loss of 0.25 dB/km or less.
B: transmission loss of more than 0.25 dB/km and 0.3 dB/kin or less.
C: transmission loss of more than 0.3 dB/km.

TABLE 1

| | Example | | | | | | | |
|---|---|---|---|---|---|---|---|---|
| | 1 | 2 | 3 | 4 | 5 | 6 | 7 | 8 |
| Resin composition for secondary resin layer | S1 | S2 | S3 | S4 | S5 | S6 | S7 | S8 |
| P content (mass %) | 0.07 | 0.13 | 0.18 | 0.18 | 0.18 | 0.18 | 0.22 | 0.27 |
| Polyfunctional monomer having bisphenol A moiety (mass %) | 25 | 25 | 25 | 40 | 50 | 60 | 60 | 60 |
| Amount of P—Sn complex/Amount of hydrocarbon (ppm) | 500 | 3000 | 6000 | 4500 | 3500 | 2500 | 3500 | 4500 |
| Young's modulus of secondary resin layer (Mpa) | 1200 | 1200 | 1200 | 1400 | 1500 | 1600 | 1600 | 1600 |
| Single-core separability | B | B | A | A | A | B | A | A |
| Peeling resistance | OK | OK | OK | OK | OK | OK | OK | OK |
| Cable loss characteristics (dB/km) | B | B | B | A | A | A | A | A |

TABLE 2

| | Comparative Example | |
|---|---|---|
| | 1 | 2 |
| Resin composition for secondary resin layer | S9 | S10 |
| P content (mass %) | 0.02 | 0.36 |
| Polyfunctional monomer having bisphenol A moiety (mass %) | 25 | 60 |
| Amount of P—Sn complex/Amount of hydrocarbon (ppm) | 200 | 8000 |
| Young's modulus of secondary resin layer (Mpa) | 1200 | 1600 |
| Single-core separability | C | A |
| Peeling resistance | OK | NG |
| Cable loss characteristics (dB/km) | B | A |

REFERENCE SIGNS LIST 10, 10A: OPTICAL FIBER
11: CORE
12: CLADDING
13: GLASS FIBER
14: PRIMARY RESIN LAYER
15: COLORED SECONDARY RESIN LAYER
16: COATING RESIN LAYER
20: CONNECTING PORTION
21: NON-CONNECTING PORTION
40: CONNECTING RESIN LAYER
100, 100A, 100B, 100C: OPTICAL FIBER RIBBON

What is claimed is:

1. An optical fiber ribbon comprising:
a plurality of optical fibers arranged in parallel; and
a connecting resin layer containing a ribbon resin for coating and connecting the plurality of optical fibers,
wherein each of the plurality of optical fibers has an outer diameter of 220 μm or less;
each of the plurality of optical fibers includes a glass fiber containing a core and a cladding, a primary resin layer in contact with the glass fiber for coating the glass fiber, and a colored secondary resin layer for coating the primary resin layer;
the colored secondary resin layer contains a cured product of a resin composition containing 2,4,6-trimethylbenzoyldiphenylphosphine oxide as a photopolymerization initiator; and
a content of phosphorus in the colored secondary resin layer is 0.03 mass % or more and 0.30 mass % or less, and an amount of a phosphorus-tin complex at the surface of the colored secondary resin layer is 300 ppm or more and 7000 ppm or less, and
wherein the resin composition further contains a polyfunctional monomer having a bisphenol moiety.

2. The optical fiber ribbon according to claim 1, wherein the amount of the phosphorus-tin complex is 500 ppm or more and 6000 ppm or less.

3. The optical fiber ribbon according to claim 1, wherein the average distance between the centers of adjacent optical fibers among the plurality of optical fibers is 220 μm or more and 280 μm or less.

4. The optical fiber ribbon according to claim 1, wherein the resin composition further contains a silicone-based lubricant.

5. The optical fiber ribbon according to claim 1, wherein the resin composition further contains 1-hydroxycyclohexyl phenyl ketone as a photopolymerization initiator.

6. The optical fiber ribbon according to claim 1, wherein the Young's modulus of the colored secondary resin layer is 1200 MPa or more at 23° C.

7. The optical fiber ribbon according to claim 1, wherein the optical fiber ribbon has a connecting portion and a non-connecting portion intermittently in the longitudinal direction and the width direction.

8. The optical fiber ribbon according to claim 1, wherein the connecting resin layer has a recess at the portion connecting adjacent optical fibers among the plurality of optical fibers.

9. An optical fiber cable comprising the optical fiber ribbon according to claim 1 incorporated in the cable.

10. The optical fiber ribbon according to claim 1, wherein the colored secondary resin layer further contains a pigment.

* * * * *